United States Patent
Fellhauer et al.

(10) Patent No.: US 10,320,320 B2
(45) Date of Patent: Jun. 11, 2019

(54) METHOD FOR CONTROLLING AN ELECTRICAL DRIVE, AND ELECTRICAL DRIVE

(71) Applicant: SCHUNK ELECTRONIC SOLUTIONS GMBH, St. Georgen (DE)

(72) Inventors: Bruno Fellhauer, Brackenheim (DE); Sebastian Hoepfl, Leingarten (DE); Jakob Khoury, Bietigheim-Bissingen (DE); Franz Dieterle, Schiltach (DE); Patrick Ruggieri, Trossingen (DE); Matthias Heilmann, Koenigsfeld (DE)

(73) Assignee: SCHUNK ELECTRONIC SOLUTIONS GMBH, St. Georgen (DE)

( * ) Notice: Subject to any disclaimer, the term of this patent is extended or adjusted under 35 U.S.C. 154(b) by 0 days.

(21) Appl. No.: 15/762,200

(22) PCT Filed: Sep. 19, 2016

(86) PCT No.: PCT/EP2016/072136
§ 371 (c)(1),
(2) Date: Mar. 22, 2018

(87) PCT Pub. No.: WO2017/050683
PCT Pub. Date: Mar. 30, 2017

(65) Prior Publication Data
US 2018/0302015 A1    Oct. 18, 2018

(30) Foreign Application Priority Data

Sep. 22, 2015 (DE) .................. 10 2015 218 203

(51) Int. Cl.
G05B 19/19 (2006.01)
H02K 41/02 (2006.01)
(Continued)

(52) U.S. Cl.
CPC ............ *H02P 25/06* (2013.01); *G05B 19/19* (2013.01); *G05B 19/416* (2013.01); *H02K 41/02* (2013.01);
(Continued)

(58) Field of Classification Search
CPC ...... H02P 1/00; H02P 1/04; H02P 1/24; H02P 1/26; H02P 1/46; H02P 6/00; H02P 6/006;
(Continued)

(56) References Cited

U.S. PATENT DOCUMENTS

| 4,999,551 | A  | * | 3/1991  | Yoshida | ............... | B66B 13/143 |
|           |    |   |         |         |                 | 318/286     |
| 6,828,747 | B2 | * | 12/2004 | Endo    | .................... | G05B 19/416 |
|           |    |   |         |         |                 | 318/268     |

FOREIGN PATENT DOCUMENTS

| DE | 4339565 A1  | 5/1995 |
| DE | 10333067 A1 | 3/2004 |

(Continued)

OTHER PUBLICATIONS

International Search Report and Written Opinion Form PCT/ISA/210 and PCT/ISA/237, International Application No. PCT/EP2016/072136, p. 1-10, International Filing Date Sep. 19, 2016, dated Nov. 28, 2016.

*Primary Examiner* — Antony M Paul
(74) *Attorney, Agent, or Firm* — Bond Schoeneck & King, PLLC; George McGuire (57) ABSTRACT

The invention relates to a self-learning repetitive method for an electrical drive or motor, in particular a linear or slewing drive, for determining the maximum speed during the movement of the actuator between a starting point (SP) and an end point (EP), wherein the actuator is accelerated to a speed $v_{max}$ over a first distance ($x_{beschl}$), is braked over a second distance ($x_{brems}$) and is then moved at a safe low speed (Continued)

($v_{safe}$) over a third distance ($x_{safe}$) as far as the stop and is stopped. The method is repeated with the aim of minimizing the third distance ($x_{Safe,min}$) and thereby achieving the maximum speed (BPmax, $v_{max}$). The method also provides for taking into account the external interfering influences, for example external forces and friction. The invention also relates to such an electrical drive.

13 Claims, 5 Drawing Sheets (51) Int. Cl.
    *H02P 25/06*     (2016.01)
    *G05B 19/416*     (2006.01)

(52) U.S. Cl.
    CPC ............ *G05B 2219/43071* (2013.01); *G05B 2219/43074* (2013.01); *G05B 2219/43082* (2013.01); *G05B 2219/45242* (2013.01)

(58) Field of Classification Search
CPC ..... H02P 1/54; H02P 5/46; H02P 8/00; H02K 7/10; H02K 17/32; G05B 5/00; G05B 11/00; G05B 11/01; G05D 3/00
USPC ..... 318/34, 37, 38, 687, 661, 400.4, 400.01, 318/700, 701, 727, 60, 266, 466, 432, 318/362
See application file for complete search history.

(56) References Cited

FOREIGN PATENT DOCUMENTS

| | | |
|---|---|---|
| DE | 102005010089 A1 | 9/2006 |
| EP | 0548505 A1 | 6/1993 |
| EP | 0793157 A2 | 9/1997 |

* cited by examiner

METHOD FOR CONTROLLING AN ELECTRICAL DRIVE, AND ELECTRICAL DRIVE

CROSS-REFERENCE TO RELATED APPLICATIONS

This application is the United States National Phase Application of PCT Application Number PCT/EP2016/072136, filed Sep. 19, 2016 which in turn claims priority to German Application No. DE102015218203.7, filed Sep. 22, 2015, the entire disclosure of each of which is incorporated herein by reference.

BACKGROUND OF THE INVENTION

The invention relates to a method for controlling an electrical drive, in particular a linear or slewing drive, comprising an actuator which can be moved in a forward movement between a starting point and an end point and in a return movement between the end point and the starting point. The invention also relates to such an electrical drive.

In electrical drives that are in the form of a linear drive, the actuator can be in the form of actuating jaws or a sliding rail, for example, that are/is moved in a straight line between a starting point and an end point. If the electrical drive is in the form of a slewing drive, the actuator may be provided as a slewing plate. Here, the actuator moves about a rotational axis from starting point to end point.

Electrical drives and methods for controlling them are known in various forms from the prior art. For example, DE 103 33 067 B4 discloses an electrical drive that comprises a learning device for teaching a linear path, the learning device being activated by actuating a learning operating element.

DE 10 2005 010 089 A1 discloses a method in which a speed is dynamically adapted in order to bring an actuator into an end position.

SUMMARY OF THE INVENTION

The object of the present invention is that of providing a method for controlling an electrical drive and of providing an electrical drive, in which the actuator can be moved in a "self-learning" manner at a high or maximum speed between the starting point and the end point.

This object is achieved by means of a method according to claim 1. In the method according to the invention, the actuator is accelerated to a speed $v_{max}$ over a first distance $x_{beschl}$ in a forward movement and/or return movement, is braked over a second distance $x_{brems}$ and is then moved at a low speed over a third distance $x_{safe1}$ toward a stop.

The actuator is then moved in one or more subsequent forward and/or return movements over a distance $x_{safe2}$, which is shorter than the distance $x_{safe1}$, at a lower speed, or at the lower speed $v_{safe}$, toward the stop. In this case, speed $v_{safe}$ is below the speed $v_{max}$.

A "lower speed", or the "lower speed $v_{safe}$", is understood to mean a speed at which the actuator can be driven toward the end point and the starting point such that no damage occurs to the actuator, or owing to the stops provided at the starting point and end point. The starting point and end point are therefore defined by the actuator driving against and striking the stops. These positions of the actuator can then be stored or recorded.

In accordance with the method according to the invention, the distance $x_{safe}$ therefore shortens with each subsequent forward movement and/or return movement; as a result, the braking point of the actuator, i.e. the point at which the actuator is braked, shifts in order to achieve the speed $v_{safe}$. The acceleration phase and the braking phase therefore become longer and the distance $x_{safe}$ becomes shorter. The maximum speed $v_{max}$ to be achieved increases owing to the longer acceleration phases. Overall, a faster forward and/or return movement of the actuator is thereby achieved in subsequent movement cycles. With each pass of a forward movement and/or return movement, the time required for the actuator to move from the starting point to the end point, or the end point to the starting point, can therefore be shortened. Nevertheless, it is ensured that the actuator strikes the particular stop at the permitted speed $v_{safe}$ so that no damage occurs to the actuator or the particular stop.

Accelerating along the distance $x_{beschl}$, achieving the speed $v_{max}$, and braking along the distance $x_{brems}$ can therefore take place in each case by applying maximum current to a motor driving the actuator, such that the actuator is accelerated to a maximum and braked to a maximum. The acceleration and braking can take place in this case using identical or different absolute values.

In particular when starting up the drive or during the first forward and/or return movement, in a starting phase the actuator can be accelerated merely to a low speed $v_{safe}$. Consequently, an additional acceleration to a higher speed or to the speed $v_{max}$ does not take place. This is advantageous in that the starting point and the end point can be initially "located" during the first forward movement and/or return movement. For this purpose, the actuator strikes the particular stop of the starting point and end point. These positions, i.e. the starting point and the end point, can then be recorded, in particular can be stored in a memory.

In this starting phase, the distance $x_{safe}$ therefore extends over substantially the entire length between the starting point and end point.

A teaching phase relating to several forward and return movements can follow this training phase, in which movements each of the distances $x_{safe1, 2 \ldots n}$ become shorter with each pass, until a distance $x_{safe}$ is finally achieved that corresponds to a minimum length $x_{safe-min}$. At the same time, the maximum speeds $v_{max1, 2, \ldots n}$ become higher in each forward and return movement, until the maximum speed $v_{max}$ is achieved. The braking point between acceleration and braking is therefore displaced during the forward movement away from the starting point toward the end point, and during the return movement away from the end point toward the starting point. In the training and teaching phase, the user has full functionality but with a longer cycle time.

If $x_{safe-min}$ is achieved, the drive is in the operating phase in which the acceleration phase is at its maximum length and the speed $v_{max}$ is at its maximum. During further back and forth movements, $x_{safe-min}$ does not shorten any further.

The teaching phase can in particular seamlessly follow the above-described starting phase, specifically without the operator of the drive having to take any measures. The drive also relatively quickly achieves the operating phase that follows the teaching phase, without any outside assistance, in which operating phase the actuator is moved at its maximum speed from the starting point to the end point and/or from the end point to the starting point. By providing the minimum, still-permitted length of the distance $x_{safe}$, it can nevertheless be ensured that the actuator strikes the particular stop at a still-permitted speed.

Advantageously, the minimum distance $x_{safe-min}$ and/or the maximum speed $v_{max}$ can be specified. The operator can therefore determine, by means of the specification of the distance $x_{safe-min}$ or by means of the specification of the speed $v_{max}$, whether the distance $x_{safe}$ should be relatively long or relatively short in the operating phase.

Furthermore, it is advantageous if the external interfering influences acting on the actuator are detected, said external interfering influences being in the form of forces acting on the actuator. The interfering influences may in particular depend on components arranged on the actuator or may depend on components to be moved by the actuator. The interfering influences may also be specified by an installation position, for example by a horizontal or vertical movement of the actuator. External forces and occurring friction that can be at various levels, depending on the service life, also influence the movement and are interfering influences. Advantageously, during the operating phase, the interfering influences are continuously detected and the drive parameters are continuously adapted to the interfering influences. Therefore, the drive drives the actuator in such a way that the interfering influences are taken into account.

However, if a specifiable susceptibility to interference is exceeded, it is advantageous for the drive to then switch to an interference mode. In this case, the susceptibility to interference is inverse to a robustness of the drive. A high susceptibility to interference corresponds to a low level of robustness; a low susceptibility to interference corresponds to a high level of robustness.

The interference mode can be such that the actuator is moved at the speed $v_{safe}$ merely over the entire distance from starting point as far as the end point. The interference mode can also be designed such that the drive is shut down or undergoes an emergency stop.

The interfering influences can be detected in particular by means of an acceleration monitoring process. This can be realized in such a way that, for example, the acceleration of a previous forward movement is compared with the acceleration of a subsequent forward movement, and such that in the event of an excessive difference between the two accelerations, the specifiable susceptibility to interference is exceeded. In the event of small differences, the drive parameters can be adapted accordingly, and so during a following forward movement, an adapted acceleration can be carried out again. Of course, the same applies to the return movements. In the event of great differences, it is possible to switch to the interference mode.

Advantageously, it is not only the distance $x_{safe-min}$ and/or the maximum speed $v_{max}$ that can be adjusted; the susceptibility of the drive to interference can also be adjusted. As a result, it can be specified whether or not a relatively early or late switch into interference mode takes place.

It has been found to be particularly advantageous for the susceptibility to interference to be reduced at the same time as the distance $x_{safe}$ lengthens and/or the maximum speed $v_{max}$ increases, and/or for the susceptibility to interference to be increased if the distance $x_{safe}$ is shortened and/or the maximum speed $v_{max}$ is reduced. Advantageously, this can take place by means of a variable speed governor for the forward movement and an additional variable speed governor for the return movement. Therefore, if the distance $x_{safe}$ is selected to be very short or if the maximum speed $v_{max}$ is selected to be very high, which causes a very fast back and forth movement of the actuator, interfering influences which are already low may be sufficient for the drive to switch into interference mode. If, however, the drive is driven relatively slowly, by reducing the speed or extent of the distance $x_{safe}$, greater interference influences can occur without the drive switching to interference mode.

Advantageously, in the starting point and/or the end point, the actuator strikes the stop with increased or maximum force. Due to the fact that the drive knows the positions of the stops and, preferably, also the movement speeds, the actuator can be moved such that an increase in force is provided when striking the particular stop. This is advantageous in that vibrations occurring when the actuator strikes the stop are reduced and in particular are minimized.

The object mentioned at the outset is achieved by an electrical drive, in particular a linear or slewing drive, that is operated in accordance with the method according to the invention. Such a drive comprises an actuator which can be moved in a forward movement between a starting point and an end point and in a return movement between the end point and the starting point. Furthermore, in particular adjustable stop means are provided, which the actuator strikes in the starting point and/or end point. In addition, an electrical motor is provided, by means of which the actuator is moved. Furthermore, it is advantageous for position-measuring means to be provided for determining the position of the actuator, and for a controller to be provided for activating the motor, in particular depending on the signals from the position-measuring means. The controller is designed and equipped such that the drive can be operated according to the invention.

Furthermore, it is advantageous for adjustment means to be provided, in particular an adjustment regulator for adjusting the length of the distance $x_{safe}$ and/or the maximum speed $v_{max}$.

Furthermore, it is advantageous for influence measuring means to be provided for determining the external interfering influences acting on the actuator, for example in the form of acceleration sensors provided on the actuator.

Furthermore, it is advantageous for adjustment means to be provided for adjusting the susceptibility of the drive to interference, the drive being switched into an interference mode if the interference influences exceed the susceptibility to interference.

In order to optimally set the forward movement and return movement, it is advantageous for an adjustment element to be provided in each case for the forward movement and the return movement, it then being possible for the respective distance $x_{safe}$ and/or the maximum speed $v_{max}$ to be adjusted by the respective adjustment means. If the distance $x_{safe}$ is lengthened and the speed $v_{max}$ is reduced, the susceptibility to interference is reduced, and if the distance $x_{safe}$ is shortened and the maximum speed $v_{max}$ is increased, the susceptibility to interference is increased. The adjustment means can be in the form of a variable transformer. Advantageously, a total of two variable transformers are provided: one variable transformer for the forward movement and one variable transformer for the return movement.

The motor can in particular be in the form of a linear motor, it being possible for the controller to be integrated in the motor. The position measuring means for determining the position of the actuator may be formed by the secondary part of the linear motor.

Further advantages and advantageous embodiments of the invention can be found in the following description, in which the invention is described and explained in more detail on the basis of an embodiment.

DETAILED DESCRIPTION

Figure 1:
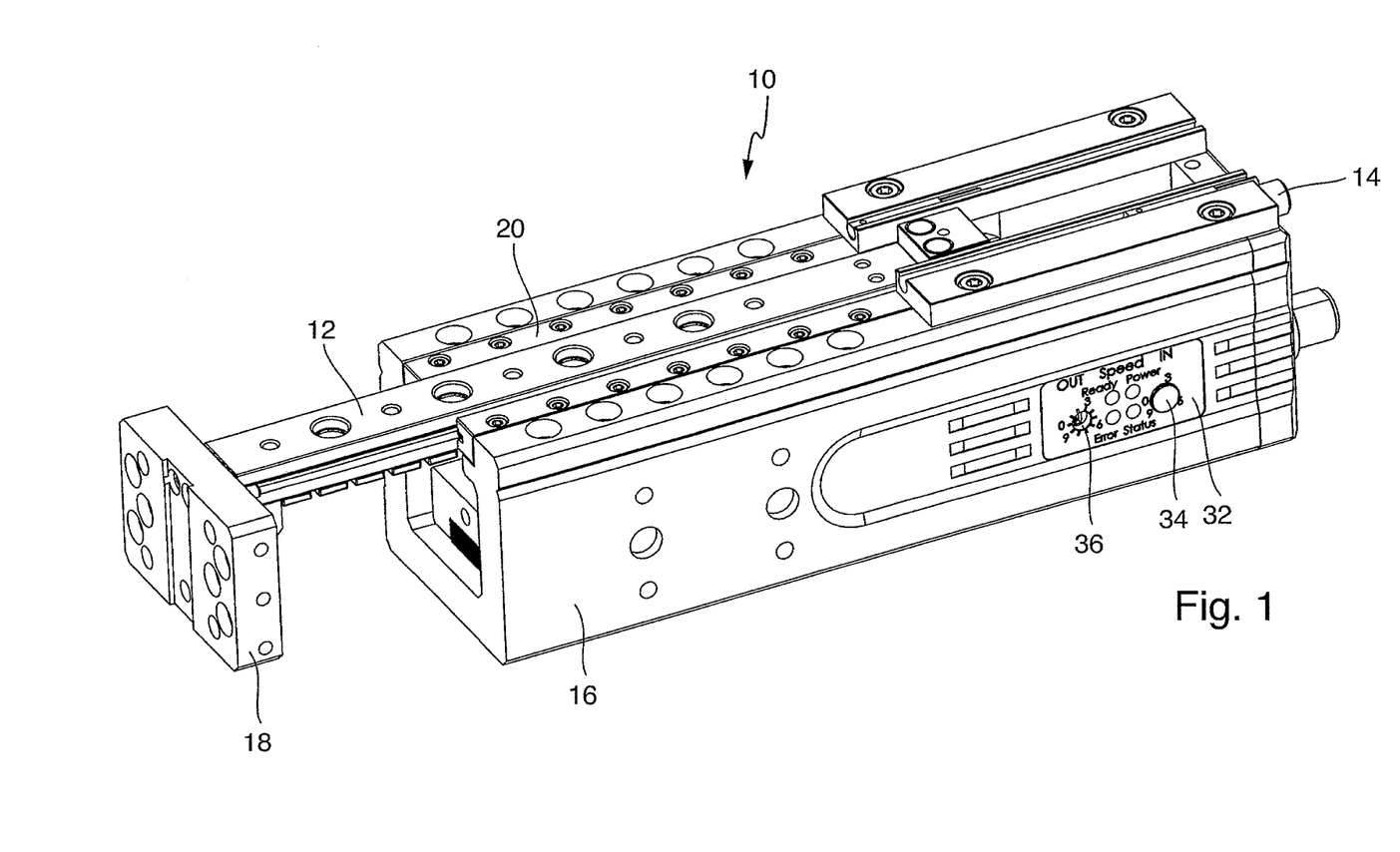
FIG. 1 is a perspective view of a drive according to the invention.
Figure 2:
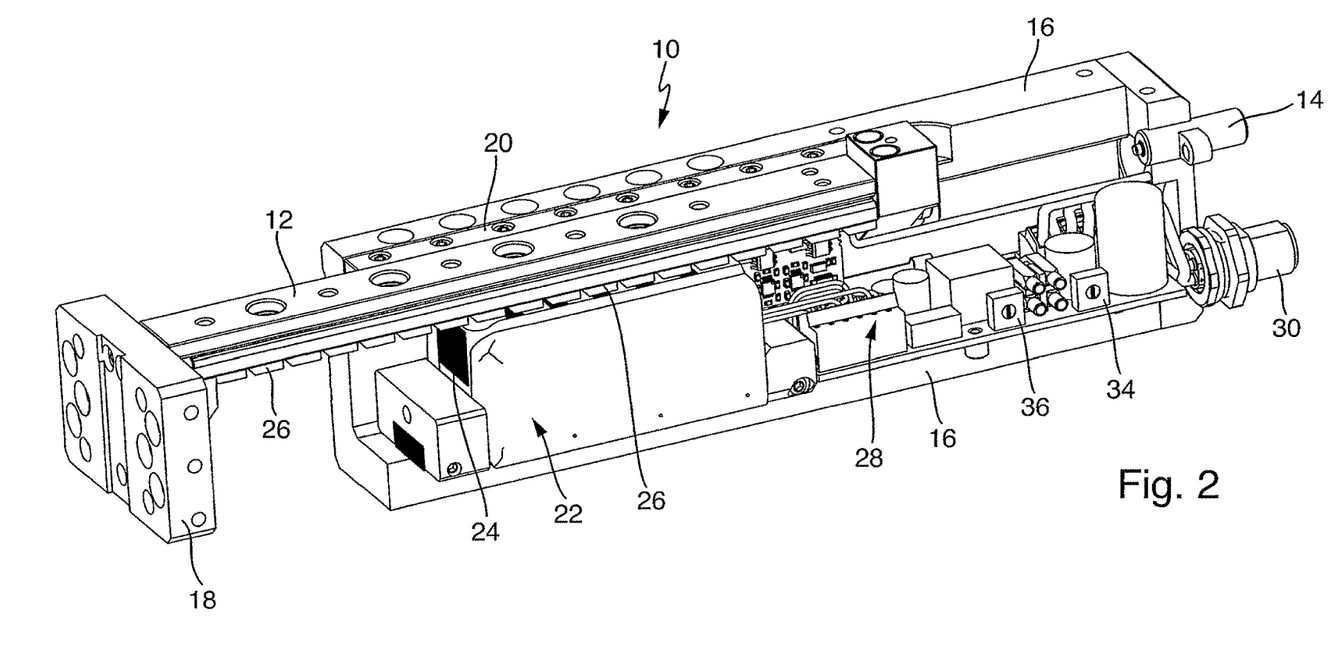
FIG. 2 shows the drive according to FIG. 1 with the housing cut open.

FIGS. 1 and 2 show an electrical drive 10 in the form of a linear drive. The drive 10 comprises an actuator 12 in the form of an axial bar. The actuator 12 can be moved between two stops 14, although only one stop 14 is visible in FIGS. 1 and 2. The stop 14 is adjustably arranged in a housing 16 in the movement direction of the actuator 12. An additional stop is provided below the actuator 12, which stop is covered by the actuator 12 owing to the perspective of FIG. 2. This additional stop is also preferably adjustable, and so the actuator 12 can be moved in a forward movement and a return movement between a starting point, which is specified by a stop 14, and an end point, which is specified by an additional stop 14.

On its free end, the actuator 12 provides an adapter plate 18, to which components to be moved can be fastened. The actuator 12 is movably mounted in the housing 16 by a cross roller guide 20.

In order to move the actuator 12, a motor 22 is provided in the housing, which motor is in the form of a linear motor. As is clear in particular from FIG. 2, the motor comprises a stator 24 which is accommodated in the housing and comprises corresponding magnet windings. Permanent magnets 26 are provided on the underside of the actuator, which permanent magnets interact with the stator 24 and form the secondary part of the motor. By appropriately supplying current to the stator 24, the actuator 12 moves, which movement results in the forward movement and return movement between the starting point and the end point.

A controller 28 is also integrated in the housing 16, which controller processes the various input signals and controls the motor 22 accordingly. In order to supply current, an electrical connection 30 is provided.

The drive 10 additionally comprises position measuring means for determining the position of the actuator 12. The position measuring means are formed by the permanent magnets 26 provided on the actuator 12 and a magnetic field sensor provided on the housing 16, which magnetic field sensor detects alternating magnetic fields within its detection range and emits corresponding signals to the controller 28.

As can be seen in FIG. 1, the drive 10 has a control panel 32, on which various status notifications are indicated, namely: "Ready", "Power", "Error" and "Status". Furthermore, two adjustment means 34 and 36 are provided which are formed as variable transformers. The adjustment means 34 or 36 respectively can be used to adjust the susceptibility to interference or speed of the actuator 12 in its forward movement and/or return movement.

The drive 10, and/or its controller 28, is designed such that, during operation, the drive functions as follows:

In total, the drive can be operated in three different phases: firstly in the starting phase; secondly in the teaching phase; and also in the operating phase.

When the drive is being started up, the drive is initially in the starting phase. For this purpose, in particular during the first forward movement between the starting point SP and the end point EP, and also during the first return movement between the end point EP and the starting point SP, the actuator is accelerated to a low speed $v_{safe}$. During the first forward movement and return movement, the controller 28 does not know the position of the starting point SP and the end point EP, which can be displaced by the adjustable stops 14. In this case, the low speed $v_{safe}$ is selected such that the actuator 12 is moved toward and strikes the stops 14, without the actuator 12 or the stops being damaged. The position of the starting point SP and the end point EP can then be detected by the position measuring means after the first forward movement and return movement and can be recorded in the controller 28.

Figure 3:
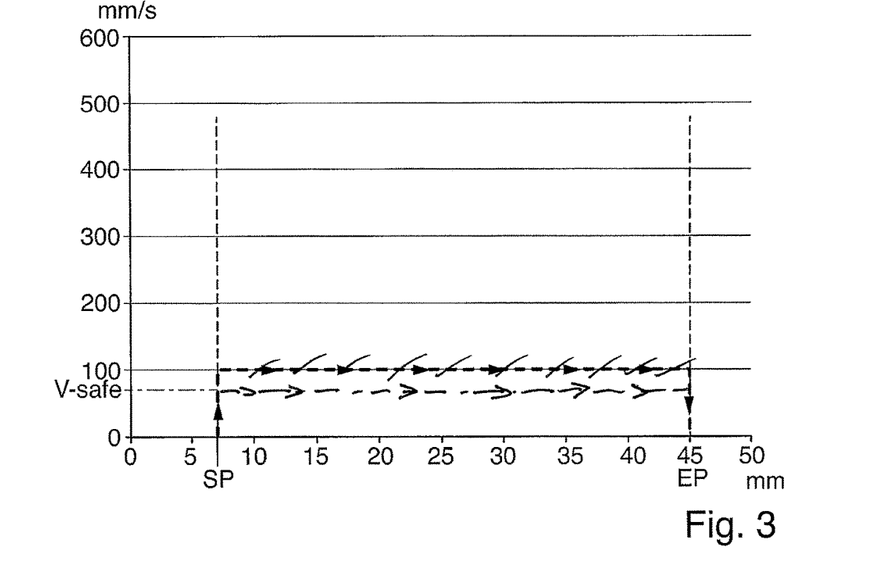
FIGS. 3 and 4 show the movement path of the actuator over its speed in the starting phase.

In FIG. 3, the forward movement of the actuator is entered in millimeters over the speed in millimeters/second. It can be seen that the actuator 12 starts at the starting point SP at the position "7 millimeters" and is accelerated to a speed $v_{safe}$ of approximately 80 millimeters per second until it strikes the stop 14 at 45 millimeters at the end point EP and is braked to a speed of 0 millimeters per second.

Figure 4:
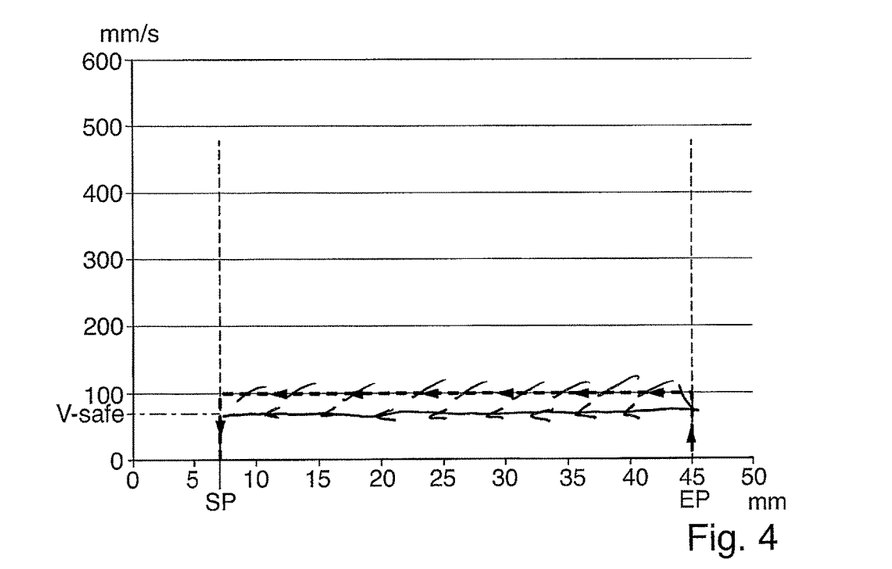

FIG. 4 shows the first return movement, specifically from the endpoint EP 45 millimeters to the starting point SP 7 millimeters.

It is therefore clear from FIGS. 3 and 4 that the actuator 12 is moved substantially at a constant speed $v_{safe}$ over the entire first forward movement and the entire first return movement.

Figure 5:
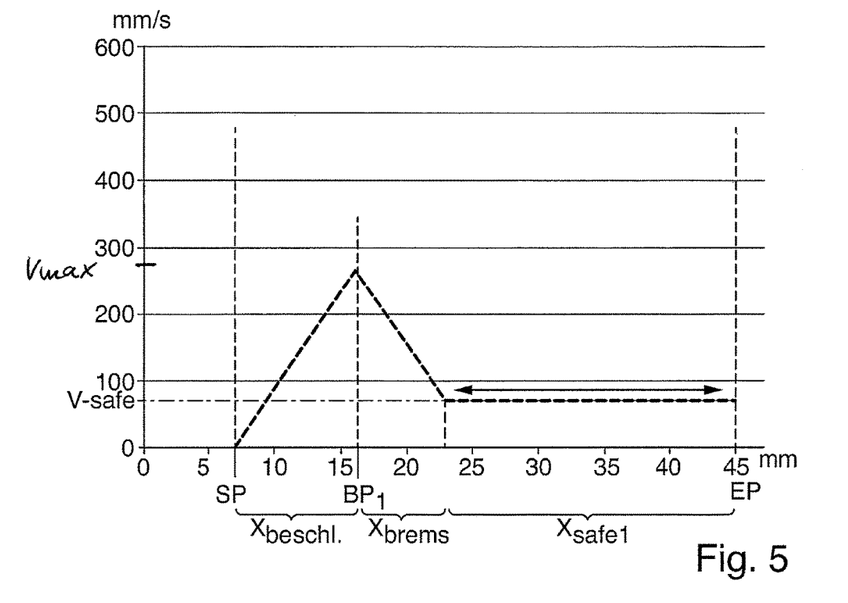
FIGS. 5 and 6 show the movement path of the stop over its speed in the teaching phase.
Figure 6:
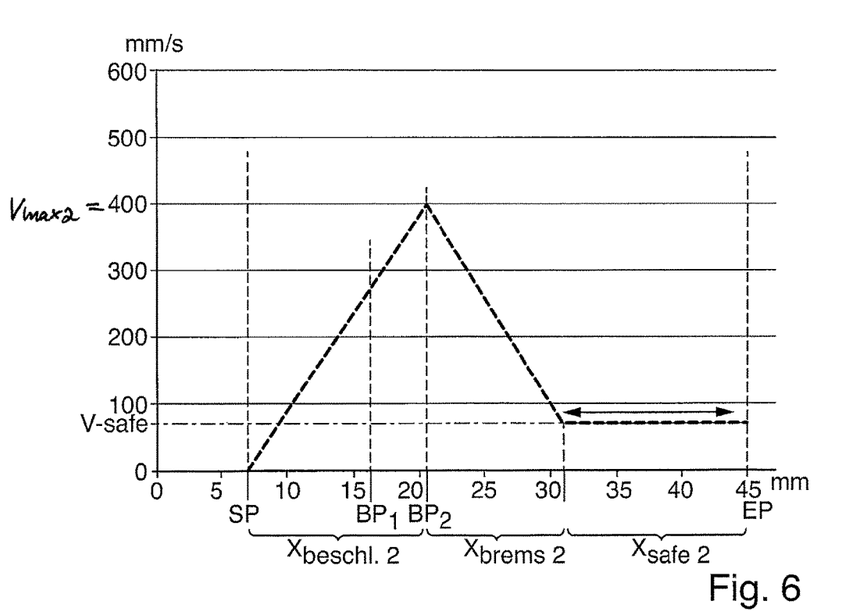

A teaching phase then follows the starting phase, which teaching phase is described in more detail in FIGS. 5 and 6. In the teaching phase, in the forward movement and the return movement over a first distance $x_{beschl}$, the actuator is accelerated to a speed $v_{max1}$ of approximately 270 mm/s, specifically up to a first braking point BP1 which, according to FIG. 5, is approximately 16 mm. A second distance $x_{brems}$ then follows the distance $x_{beschl}$, within which second distance the actuator is braked from the speed it has in braking point BP1 to the low speed $v_{safe}$. The distance $x_{safe1}$ then follows the distance $x_{brems}$, in which distance $x_{safe1}$ the actuator 12 is moved at the low speed as far as the end stop EP, at which said actuator strikes the stop 14. The actuator is preferably accelerated to a maximum within the distance $x_{beschl}$ and is braked to a maximum within the distance $x_{brems}$.

In order to reduce vibration damping when the actuator strikes the stops, it is advantageous for the controller 28 to control the motor 22 such that the actuator 12 strikes the stop at the starting point and the end point with an increased and in particular maximum force.

In subsequent forward and return movements, the braking point BP, as shown in FIG. 6, is displaced toward the end point EP or, in return movements, toward the starting point SP. Accompanying this is a greater maximum speed $v_{max2}$ of approximately 400 mm/s and a shortening of the distance $x_{safe}$. It is therefore clear from FIG. 6 that in a further forward movement, the actuator 12 is accelerated over the distance $x_{beschl2}$ as far as the braking point BP2, and is then subsequently braked over the distance $x_{brems2}$. From X=31 mm, the actuator 12 is then moved at the speed $v_{safe}$ as far as the end point, i.e. along the distance $x_{safe2}$. Owing to the longer acceleration as far as the braking point BP2, the $v_{max2}$ of 400 mm/sec is achieved, which results in a forward movement which is temporally shorter than the previous forward movement according to FIG. 5. Therefore, overall the actuator is moved between the starting point SP and end point EP within a shorter duration.

Figure 7:
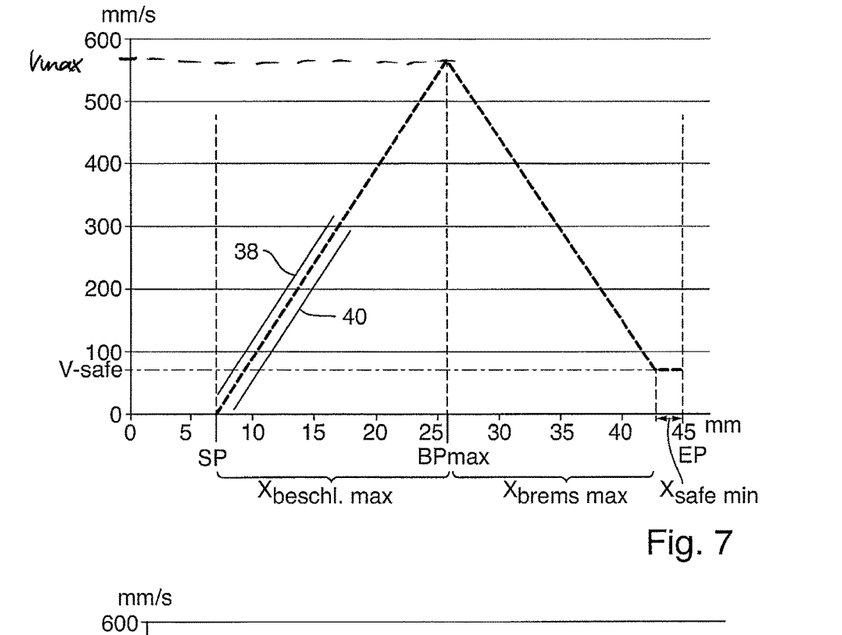
FIGS. 7 and 8 show the movement path of the actuator over its speed in two different operating phases.

In another forward movement, the braking point is displaced further toward end point EP or the distance $x_{safe}$ is further shortened and the speed $v_{max}$ is further increased for a time until the distance $x_{safe}$ has reached a specifiable, minimum length $x_{safe-min}$, as shown in FIG. 7.

In this state, as is shown in FIG. 7, the operating phase is then achieved; the actuator 12 moves at a maximum speed $v_{max}$ of approximately 570 mm/s in a maximally short time between the starting point SP and the end point EP. The actuator 12 is accelerated over a maximum distance $x_{beschl-max}$ as far as the braking point $BP_{max}$. The distance $x_{brems-max}$ follows this, within which distance the actuator is limited to the speed $v_{safe}$. The distance $x_{safe-min}$ is selected such that it is ensured that the actuator 12 strikes the stop 14 at the still-permitted speed $v_{safe}$.

During operation, interfering influences are measured in particular by an acceleration sensor provided on the actuator 12, which interfering influences result from forces acting on the actuator 12. The interfering influences can occur as a result of different installation positions, moved masses, external forces or friction. If the interfering influences change only within a specified susceptibility to interference, these interfering influences are automatically corrected by the drive. In FIG. 7, a permitted level of susceptibility to interference is indicated by the two parallel lines 38, 40, within which level of susceptibility to interference an acceleration by the drive is permitted. Acceleration fluctuations within these two lines 38, 40, i.e. within the susceptibility to interference, are leveled out by the drive, so that it can be ensured that the distance $x_{safe-min}$ can be maintained, which in turn means that the actuator 12 strikes the stop 14 at the still-permitted speed $v_{safe}$.

As mentioned at the outset, the susceptibility of the actuator 12 to interference in a forward movement or return movement can be adjusted by means of the two adjustment means 34 and 36. The change to the susceptibility to interference also means that, when the susceptibility to interference increases, the speed $v_{max}$ increases and the distance $x_{safe}$ reduces, and when the susceptibility to interference reduces, the speed $v_{max}$ reduces and the distance $x_{safe}$ is lengthened.

Figure 8:
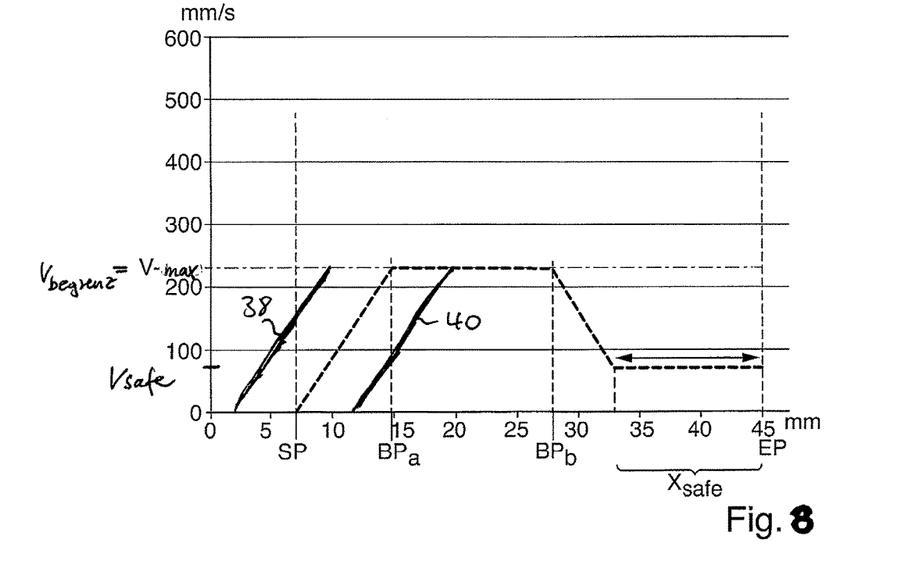

FIG. 8 shows an operating state, in which the susceptibility to interference in the forward movement is reduced by the adjustment means 34. The two interfering influence lines 38, 40 are shown here mutually spaced further apart, as a result of which greater acceleration or speed fluctuations within the distance $x_{beschl}$ are permitted. Accompanying this is a limited permitted speed $v_{max}=v_{begrenzt}$, and an enlarged distance $x_{safe}$.

In the braking point BPa, the acceleration is therefore terminated and the actuator 12 is moved back to braking point BPb at a largely constant speed $v_{begrenzt}$. Here, braking to the still-permitted speed $v_{safe}$ takes place.

As a result of greater acceleration or speed fluctuations being permitted, it is necessary for the distance $x_{safe}$ to be enlarged accordingly, in order to always ensure that the actuator 12 strikes the stop 14 in the end point at the still-permitted speed $v_{safe}$.

The drive 10 shown in the drawings is therefore advantageous in that the operator does not have to take any further measures after starting up the drive. The drive 10 automatically goes into the starting phase, following this into the teaching phase, and then into the operating phase. Monitoring the acceleration of the actuator 12 always ensures that the actuator 12 is moved for a maximally short time between the starting point and the end point. For very rapid movements, the susceptibility to interference can be increased; for low acceleration deviations, the controller then switched into an interference mode when the susceptibility to interference is exceeded.

For example, it is conceivable in the interference mode for the actuator 12 to be braked into the still-permitted speed $v_{safe}$ or for the actuator to be stopped.

If the robustness of the drive 10 is to be increased, or if the susceptibility to interference is to be lowered, this can take place by means of the corresponding variable transformer 34, 36. Overall, the actuator is then not moved at such high speeds $v_{max}$. However, it is ensured that in the event of greater acceleration deviations, the actuator is nevertheless reliably moved from the starting point to the end point.

What is claimed is:

1. Method for controlling an electrical drive, comprising the steps of: moving an actuator in a forward movement between a starting point (SP) and an end point (EP) and in a return movement between the end point (EP) and the starting point (SP), accelerating the actuator in at least one of the forward movement and the return movement, to a speed $v_{max}$ over a first distance $x_{beschl}$, braking over a second distance $x_{brems}$ and then moving at a lower speed $v_{safe}$ over a third distance $x_{safe1}$ as far as a stop, characterized in that the actuator is moved, in at least one subsequent movement, at a low speed, or at the low speed $v_{safe}$, over a distance $x_{safe2}$ that is shorter than the distance $x_{safe1}$, toward the stop, the acceleration phase and the braking phase becoming longer owing to the distance $x_{safe2}$ that is becoming shorter, and the maximum speed $v_{max}$ to be achieved increasing owing to the longer acceleration phase.

2. Method according to claim 1, characterized in that in a starting phase, in particular during the first forward movement and/or the first return movement, the actuator is accelerated only to the low speed $v_{safe}$.

3. Method according to claim 1, characterized in that in a teaching phase over several forward and return movements, the distances $x_{safe1}$, $x_{safe2}$ become shorter, until a minimum distance $x_{safe-min}$ is achieved.

4. Method according to claim 3, characterized in that at least one of the length of the minimum distance $x_{safe-min}$ and the maximum speed $v_{max}$ are specifiable.

5. Method according to claim 1, characterized in that the external interfering influences acting on the actuator are detected, the actuator being driven such that at least one of the interfering influences are taken into account and the drive is switched to an interference mode, if the interfering influences exceed a specified susceptibility to interference.

6. Method according to claim 5, characterized in that the interfering influences are detected by means of an acceleration monitoring process.

7. Method according to claim 5, characterized in that the susceptibility to interference can be adjusted.

8. Method according to claim 5, characterized in that, when at least one of the distance $x_{safe}$ is lengthened and the maximum speed $v_{max}$ is increased, at least one of the following occurs: the susceptibility to interference reduces, and when either of the distance $x_{safe}$ is shortened and the maximum speed $v_{max}$ is reduced, the susceptibility to interference is increased.

9. Method according to claim 1, characterized in that, at either of the starting point (SP) and end point (EP), the actuator strikes the stop with an increased force.

10. Electrical drive, comprising an actuator that can be moved in a forward movement between a starting point (SP) and an end point (EP), and in a return movement between the end point (EP) and the starting point (SP), comprising adjustable stop means, against which the actuator strikes at least one of a starting point (SP) and end point (EP), comprising an electrical motor for moving the actuator, comprising position measuring means for determining the position of the actuator, comprising a controller for controlling the motor depending on the signals from the position measuring means, characterized in that the controller is designed and equipped in such a way that the drive can be operated during operation, and comprising influence-adjusting means for adjusting the length of the distance $x_{safe}$ and/or speed-adjusting means for adjusting the maximum speed $v_{max}$.

11. Electrical drive according to claim 10, characterized in that at least one of the length-adjusting means for adjusting the length of the distance $x_{safe}$ and/or speed-adjusting means for adjusting the maximum speed $v_{max}$ are provided.

12. Electrical drive according to claim 11, characterized in that an adjustment means is provided for each forward movement and return movement, such that during each movement the susceptibility to interference is increased by at least one of lengthening the distance $x_{safe}$ and reducing the maximum speed $v_{max}$, and in each case the susceptibility to interference is reduced by at least one of shortening the distance $x_{safe}$ and increasing the maximum speed $v_{max}$.

13. Electrical drive according to claim 10, characterized in that the motor is a linear motor.

\* \* \* \* \*